United States Patent [19]

Delajoud

[11] Patent Number: 5,445,035
[45] Date of Patent: Aug. 29, 1995

[54] PRECISION GAS MASS FLOW MEASUREMENT APPARATUS AND METHOD MAINTAINING CONSTANT FLUID TEMPERATURE IN THIN ELONGATED FLOW PATH

[76] Inventor: Pierre R. Delajoud, 109 Rue de Longchamp, 92200 Neuilly sur Seine, France

[21] Appl. No.: 166,264

[22] Filed: Dec. 10, 1993

Related U.S. Application Data

[63] Continuation of Ser. No. 809,677, Dec. 18, 1991, abandoned.

[51] Int. Cl.⁶ .................................................. G01F 1/37
[52] U.S. Cl. ............................. 73/861.52; 73/861.01; 138/40
[58] Field of Search ........... 73/861.52, 861.61, 861.01, 73/861.02, 861.03; 138/40, 44

[56] References Cited

U.S. PATENT DOCUMENTS

| | | | |
|---|---|---|---|
| 3,071,160 | 1/1963 | Weichbrod | 138/40 |
| 3,115,777 | 12/1963 | Hochreiter . | |
| 3,173,003 | 3/1965 | Muller-Girard . | |
| 3,196,680 | 7/1965 | Curran . | |
| 3,220,256 | 11/1965 | Weichbrod | 73/205 |
| 3,349,619 | 10/1967 | Millar | 73/205 |
| 3,605,496 | 9/1971 | Wenham . | |
| 3,701,280 | 10/1972 | Stroman . | |
| 3,838,598 | 10/1974 | Tompkins | 73/205 |
| 3,840,051 | 10/1974 | Akashi et al. . | |
| 4,408,498 | 10/1983 | Heath . | |
| 4,419,898 | 12/1983 | Zanker et al. | 73/861.02 |
| 4,419,898 | 12/1983 | Zanker . | |
| 4,484,472 | 11/1984 | Licinit et al. | 138/40 |
| 4,562,744 | 1/1986 | Hall et al. | 73/861.61 |
| 4,576,204 | 3/1986 | Smallhorn et al. | 138/40 |
| 4,768,384 | 9/1988 | Flecken et al. . | |
| 4,799,169 | 1/1989 | Mims . | |
| 4,829,449 | 5/1989 | Polesnak | 73/861.03 |

FOREIGN PATENT DOCUMENTS

| | | |
|---|---|---|
| 0370557 | 5/1990 | European Pat. Off. . |
| 405084 | 10/1924 | Germany . |
| 0109866 | 8/1979 | Japan ............................ 73/861.52 |
| 55-51312 | 4/1980 | Japan . |
| 767047 | 1/1957 | United Kingdom . |
| 1131850 | 10/1968 | United Kingdom . |
| 2161941 | 1/1986 | United Kingdom . |
| 1530913A | 12/1989 | U.S.S.R. . |

Primary Examiner—Stephen Chin
Assistant Examiner—Timothy J. May
Attorney, Agent, or Firm—Cahill, Sutton & Thomas

[57] ABSTRACT

A mass flow meter includes a body having a cylindrical bore and an elongated cylindrical piston positioned in the bore concentrically therewith. An elongated annular fluid flow channel of uniform depth is bounded by a cylindrical surface of the piston and a surface of the bore. Fluid flows laminafly through the channel. First and second concentric ferrules are located at first and second end portions of the piston to precisely position and hold the piston concentrically in the bore, by elastically expanding in response to longitudinal forces on the first and second end portions of the piston to symmetrically engage a wall of the bore. A first pressure measuring probe in fluid communication with an upstream equalization chamber measure fluid pressure in the upstream equalization chamber, and a second differential pressure transducer in fluid communication between the upstream equalization chamber and a downstream equalization chamber measures differential fluid pressure between the two equalization chambers. The difference between the pressures measured in the two equalization chambers represents the mass flow of the fluid through the channel. The simple, near-ideal geometric shapes of the bore, piston, and ferrules permits simple, accurate mathematical modeling of corrections to account for changes in pressure, temperature, and thermal gradient.

21 Claims, 4 Drawing Sheets

PRECISION GAS MASS FLOW MEASUREMENT APPARATUS AND METHOD MAINTAINING CONSTANT FLUID TEMPERATURE IN THIN ELONGATED FLOW PATH

This is a continuation of patent application Ser. No. 809,677 filed Dec. 18, 1991, now abandoned, by Pierre R. Delajoud, and entitled "MASS FLOW METER AND METHOD".

BACKGROUND OF THE INVENTION

The invention relates to mass flow measurement devices and techniques for calibrating mass flow controllers.

By way of background, mass flow controllers are widely used in the semiconductor industry to provide as much precision as possible in the control of reactant gases that flow into semiconductor reaction chambers. Such mass flow controllers need to be calibrated frequently. Up to now, the best accuracy achievable in in situ calibrating of mass flow controllers is approximately one percent. There would be a large market for a more accurate system for calibrating mass flow controllers.

One prior art mass flow controller applies heat by means of an "upstream" heat coil to a portion of the gas flow diverted through a sensor tube. The flowing gas then carries heat from the upstream coil to the downstream coil surrounding the sensor tube. The resulting temperature difference is detected, and the amount of gas mass flow can be computed from the temperature difference. This prior indirect technique for measuring mass flow is undesirably influenced by thermal considerations associated with the way the mass controller is mounted in the cabinet of the semiconductor reaction chamber. It would be desirable to find a technique for mass flow measurement which is independent of such thermal considerations.

At the present time, there is no convenient, accurate way of in situ calibrating mass flow controllers using the foregoing mass flow measurement system. Presently, if there is an unknown process problem, all of the mass flow controllers often are simply replaced in a blind effort to fix the problem. Therefore, they must be disassembled and removed from the mass flow controller from the semiconductor reaction chamber to be checked and calibrated in a remote lab facility. Such disassembly and removal is highly undesirable because it generates or loosens particles that may enter the semiconductor reaction chamber, and allows airborne particles to enter the semiconductor reaction chamber. Such particles later settle on semiconductor wafers, producing defects in integrated circuits being manufactured. In situ checking of mass flow controllers allows quick identification and recalibration of ones that may have drifted. This may also provide a much-desired quick identification and correction of the process problem if it is due to a mass flow controller, without having to disassemble and replace all of the mass flow controllers before looking for other possible causes of the process problem. Therefore, it is important that mass flow controllers be checked or calibrated under the same conditions in which they will be operated, rather than removed and calibrated in a remote calibration facility.

Those skilled in the art generally believe that the weak point in most semiconductor wafer processing is inaccuracy in gas mass flow, and that future improvements in most semiconductor processes will require greater accuracy in mass flow control technology. Thus, there is a great need for a more accurate mass flow controller in the semiconductor industry.

In a gas mass flow system, if the gas flow is restricted by an aperture and if laminar flow is maintained, the amount of gas flow is proportional to the pressure drop resulting from the restriction. Then the mass flow can be directly, rather than indirectly, computed from the pressure drop. However, if the assumptions about laminar gas flow are not met, that is, if turbulent rather than laminar flow of the gases occurs, then the proportionality of mass flow to the measured pressure drop is lost, and the calculations become inaccurate. U.S. Pat. No. 3,220,256 discloses a linear flow meter including an elongated flow element. This reference discloses measurement of the difference between upstream and downstream pressures of fluid in the flow element with laminar fluid flow. An equation is disclosed relating the pressure gradient to the volumetric flow in the elongated flow element.

There is an unmet need for a low cost, very accurate mass flow meter that maintains low fluid flow, is easily disassembled for cleaning and reassembled without changing its geometric constant, and is suitable for in situ calibration of mass flow controllers, especially in ultra-clean gas flow systems, such as semiconductor wafer processing reactors.

SUMMARY OF THE INVENTION

It is an object of the invention to provide an accurate, low cost fluid mass flow meter.

It is another object of the invention to provide an accurate, low cost mass flow meter which is easily cleaned.

It is another object of the invention to provide an accurate, low cost mass flow meter, the geometric constants of which are unchanged by disassembly for cleaning and reassembly.

It is another object of the invention to provide an accurate, low cost mass flow meter, the gas flow range of which is easily altered over a very wide measurement range.

It is another object of the invention to provide a technique for accurate in situ calibration of mass flow controllers without disassembly of the system in which gas mass flow is being controlled.

It is another object of the invention to design a system that maintains the assumptions of laminar gas flow and constant temperature along the channel in which the pressure drop occurs so that accurate computations of fluid mass flow can be made.

It is another object of the invention to provide a mass flow meter in which the pressure measurements upstream and downstream of the laminar flow element are free of fluctuations.

It is another object of the invention to provide a mass flow meter that is accurate near or at a flow value of zero and that can detect reverse flow.

It is another object of the invention to provide a mass flow element that is highly stable over time and unaffected by its orientation.

It is another object of the invention to meet the objectives above using simple mechanical parts that can be manufactured precisely enough so that the geometry of parts which produce the laminar flow regime are as close as possible to ideal, so that the fluid flow can be accurately represented mathematically.

It is another object of the invention by using simple geometric shapes, to be able to mathematically model the systematic corrections of operating variables including pressure and thermal temperature gradients.

Briefly described, and in accordance with one embodiment thereof, the invention provides a mass flow meter including a body having a cylindrical bore therein and an elongated cylindrical piston positioned in the bore concentrically therewith, an elongated annular fluid flow channel of uniform depth being bounded by a cylindrical surface of the piston and a surface of the bore, fluid flowing laminarly through the channel. First and second positioning and holding devices are located at first and second end portions of the piston, respectively, for precisely positioning and holding the piston concentrically in the bore by elastically expanding in response to longitudinal forces on the first and second end portions of the piston so as to symmetrically engage a wall of the bore. The bore and the first end portion of the piston bound an enlarged pressure equalization chamber and a first laminar flow restriction upstream from this chamber, and the bore and the second end portion of the piston bound an enlarged pressure equalization chamber and a second laminar flow restriction downstream from this chamber. A first pressure measuring transducer connected in fluid communication with the first pressure equalization chamber is used to measure fluid pressure in the first laminar flow restriction upstream of the annular fluid flow channel. A second pressure measuring transducer connected in fluid communication with the first pressure equalization chamber and a second pressure equalization chamber is used to measure the differential pressure between the two equalization chambers. The difference of the pressures measured in the first chamber and the second chamber represent the mass flow of the fluid through the channel. First and second temperature transducers are disposed in spaced relationship to each other in the body adjacent to opposite end portions of the channel. A first pressure transducer and a differential pressure transducer provide the pressure signals, and the first and second temperature probes produce a signal representing the average temperature. The mass flow meter includes a computer that computes the mass flow of fluid in the channel as a function of the pressures measured by the first and second pressure transducers and the mean measured temperature of fluid in the channel. The computer computes the mass flow in accordance or consistent with the equation $$qm = \frac{(P_1^2 - P_2^2) \cdot \rho_N \cdot T_N \cdot Z_N \cdot \pi \cdot R \cdot h^3}{T \cdot Z_1 \cdot \eta \cdot P_N \cdot 12 \cdot L}, \quad (3)$$

wherein R is the mass flow meter bore radius, h is the gap between piston and cylinder, L is the length of piston-cylinder assembly, $P_1$ is the upstream absolute pressure, $P_2$ is the downstream absolute pressure, T is the absolute temperature, $\rho_N$ is the gas normal density, $T_N$ is the normal temperature, $P_N$ is the normal pressure, $Z_N$ is the gas compressibility factor under normal conditions, $Z_1$ is the gas compressibility factor under $P_1$,T conditions, and $\eta$ is the gas dynamic viscosity under $(P_1+P_2)/2$, T conditions. In one embodiment, the first and second end portions of the piston are conically tapered, and the first and second positioning and holding devices include first and second ferrules. Each of the first and second ferrules has an outer hollow cylindrical portion having an outer surface, and each has an inner end wall with a centered hole therein receiving one of the tapered end portions of the piston. The longitudinal forces elastically deform the inner end wall and cause elastic expanding of the outer surfaces of the first and second ferrules, causing them to symmetrically engage the wall of the bore to fill the gap and precisely position and hold the piston concentrically in the bore. The longitudinal forces are produced by forcing an end plate against an end of the body and against one of the ferrules. The first and second ferrules are drilled with a plurality of symmetrical holes to constitute first and second laminar flow restrictions upstream and downstream of the first and second chambers, respectively.

In another embodiment, the first and second positioning and holding devices include first and second cylindrical flanges attached to and concentric with the first and second end portions of the piston. The first and second cylindrical flanges each have a tapered inner surface. First and second tapered elements are attached to end walls bounding the bore and engage the tapered inner surfaces, respectively. The longitudinal forces thereby expand the first and second flanges, causing outer surfaces of the first and second flanges to symmetrically engage the wall of the bore, fill the initial gap, and precisely position and hold the piston concentrically in the bore. The two ends of the piston are machined to create the first and second chambers. First and second laminar flow restrictions are formed by symmetrically positioned transverse holes in the first and second flanges of the piston.

A technique for using the same device for measuring viscosity of a fluid flowing through it is described, wherein a known mass flow is formed through the device, and the appropriate equation is solved for the viscosity. Calibration setups are described, one using a dead weight tester to establish a precise known mass flow through the mass flow meter. Two techniques for in situ checking of mass flow controllers are described.

DETAILED DESCRIPTION OF THE PREFERRED EMBODIMENTS

In accordance with the present invention, the computation of mass flow of gas includes making pressure measurements upstream and downstream of a restriction wherein laminar flow of the gas is maintained, and also by making average temperature measurements of the gas.

Mass flow of gas is precisely a function of 1) upstream gas pressure, 2) the pressure differential across the tube or restriction through which the gas flows, as long as laminar (non-turbulent) flow is maintained, 3) the "isotherm" temperature from one end to the other of the restricting element, 4) the mean gas viscosity, and 5) various other gas constants. These are the parameters of the equation which relates gas flow to the various gas parameters if laminar flow is maintained.

Figure 1:
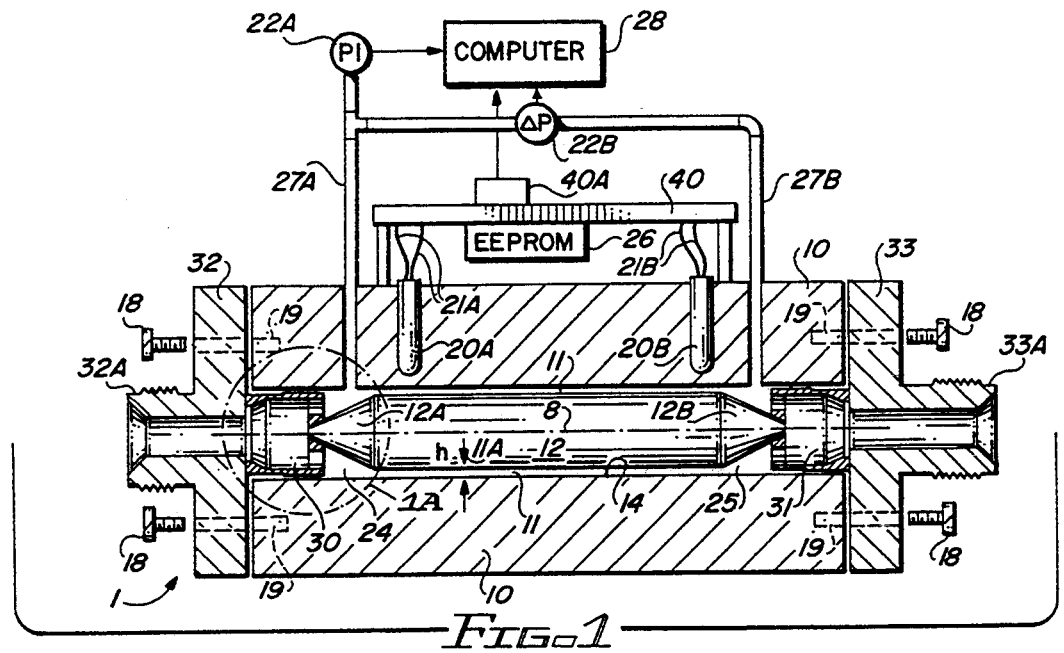
FIG. 1 is a sectional diagram of a mass flow meter of the present invention.

Referring to FIG. 1, mass flow meter 1 includes a cylinder body 10 composed of 316L low carbon stainless steel. The outer surfaces of cylinder body 10 are rectangular, and in the present embodiment, the dimensions of cylinder body 10 are 30 by 30 millimeters by 84 millimeters, and the diameter of bore 14 is 8 millimeters. The above material is used because it is compatible with corrosive gasses used and it can be very precisely electropolished. An elongated piston 12 is positioned in a precise cylindrical bore 14 of cylinder 10. Piston 12 also is composed of 316L low carbon stainless steel.

Piston 12 has opposite, symmetrical conical end portions 12A and 12B concentric with the cylindrical axis of the body of piston 12. As shown more clearly in FIG. 1A, conical end portion 12A of piston 12 is inserted into a precisely centered hole in a ferrule 30. Each of ferrules 30 and 31 are inserted into opposite ends of bore 14 of cylinder 10, and has a concentric outer end opening 16 and a smaller concentric inner end opening 30D into which the conical end portion 12A of piston 12 is tightly inserted to support piston 12 concentrically within bore 14 of cylinder 10. Conical end portion 12B is similarly seated concentrically in ferrule 31.

An annular gap 11 separates the wall of cylinder 10 and the outer surface of piston 12. Laminar flow of gas is easily maintained in the annular gap 11 by adjustment of the value of this gap by installing different diameter pistons for different values of the nominal flow.

End adapter plates 32 and 33 are attached by means of screws 18 threaded into holes 19 in the ends of cylinder body 10 through suitable clearance holes, after piston 12 and ferrules 30 and 31 have been slid into bore 14.

Figure 1A:
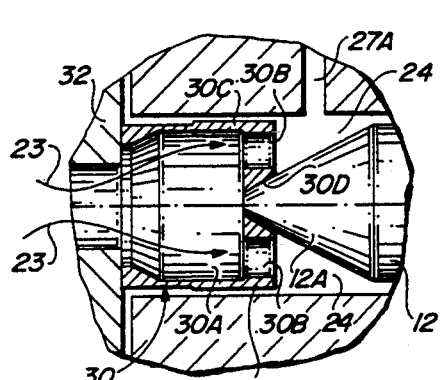
FIG. 1A is an enlarged view of detail 1A of FIG. 1.
Figure 1B:
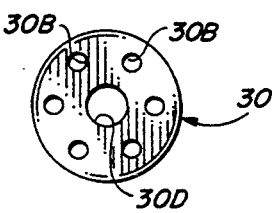
FIG. 1B is an end view of a ferrule 30 shown in FIG. 1A.

As shown in FIGS. 1A and 1B, identical ferrules 30 and 31, the outer surfaces of which are precisely cylindrical, each have six holes 30B symmetrically positioned around center hole 30D. As gas flows through ferrule 30 in the direction of arrows 23 (FIG. 1) from the inlet connector 32A of end adapter 32, the gas (or liquid) passes through holes 30B, which constitute a laminar restriction upstream of the pressure equalization chamber 24 between the sloped surface of conical end portion 12A and the surface of bore 14. Laminar flow is maintained through holes 30B by adjustment of the size and the number of holes as a function of the nominal flow. Similarly, laminar flow is maintained in the corresponding holes downstream of equalization chamber 25 between the tapered surface of conical end portion 12B and bore 14. Thus, laminar gas flow is maintained upstream and downstream of each pressure measurement which assures a very stable measurement.

Cylinder 10 has a pair of platinum resistive temperature probes 20A and 20B connected by means of leads 21A and 21B, respectively, to suitable electronic circuitry on a printed circuit board 40 mounted on the top surface of cylinder 10. Circuit board 40 provides suitable circuitry for connecting in series the two platinum probes and four wire leads for accurate resistance measurements. Block 26 contains a programmable readonly memory in which various constants, subsequently described, are stored to enable an external computer 28 to read all of the information needed to make the necessary mass flow computations (subsequently described) for mass flow meter 1. It should be noted that computer 28 and pressure transducer 22A and differential pressure transducer 22B can be integrated into block 26 using conventional microprocessor chip technology and conventional transducer miniaturization technology.

Figure 2A:
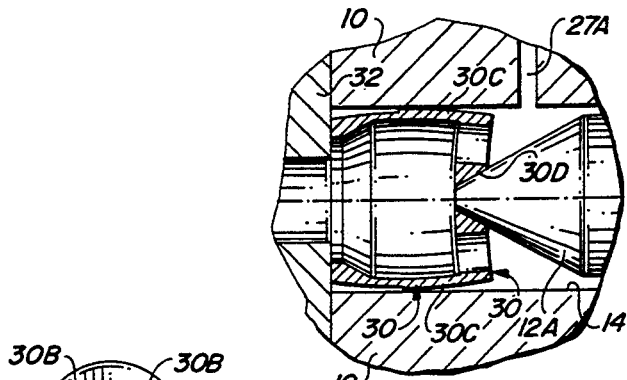
FIG. 2A is an enlarged view of detail 2A in FIG. 2.
Figure 2:
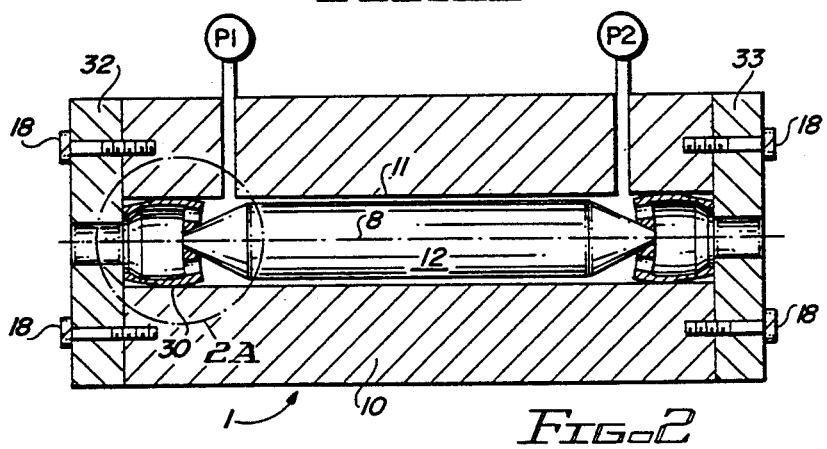
FIG. 2 is a section view illustrating deformation of the ferrules in the embodiment of FIG. 1 when the end adapters are tightened.

The length of piston 12 and the dimensions of ferrules 30 and 31 are such that when the points of conical end sections 12A and 12B are seated in openings 30D of the ferrules (FIG. 1A), the open ends of ferrules 30 and 31 extend a small distance (approximately 0.2 millimeters) beyond the right and left end faces of cylinder body 10. When screws 18 are tightly threaded into holes 19, thereby forcing end adapters 32 and 33 tightly against the opposite end faces of cylinder 10, the ferrules 30 and 31 are forced to deform slightly, as shown in FIG. 2 and FIG. 2A. Opening 30D, which when undeformed has a cone angle slightly greater than the cone angle of section 12A of piston 12, is forced outward, elastically bowing the end plate of ferrule 30 containing opening 30D.

This causes the thin cylindrical outer surface section 30C of ferrule 30 to elastically bow outward, tightly contacting and sealing to the surface of cylinder bore 14. This happens equally at both ends of piston 12, so that a very tight, precise seal is formed between bore 14 and the outer surfaces of ferrules 30 and 31. This provides extremely precise alignment of piston 12 along axis 8 of cylindrical bore 14, causing gap 11 to be very uniform, within a tolerance of ±2 micrometers. The precise concentric positioning of piston 12 within bore 14 allows subsequently described equation (5) to very accurately represent the gas mass flow through mass flow meter 1.

Cylinder 10 and piston 12 have high thermal mass relative to the thermal mass of the gas contained in gap 11, and therefore maintain uniform temperature in gas flowing along the entire length of gap 11. Gap 11 preferably is in the range from 50 to 200 micrometers for the embodiment of the invention shown in FIG. 1. The minimum length of the gap is about twice the diameter of piston 12 and there is no maximum other than to keep the device within reasonable overall dimensions.

Ports 27A and 27B are connected to pressure transducer 22A and differential pressure transducer 22B, allowing precise measurement of the upstream pressure P1 in chamber 24 and the differential pressure between P1 and downstream pressure in chamber 25. Computer 28 computes the mass flow using the upstream pressure, the differential pressure between the upstream and downstream ends of the restrictive gap 11, and the mean temperature of the cylinder 10.

The above gas flow meter can be easily disassembled by removing the end adapters 32 and 33 and ferrules 30 and 31 and removing piston 12. Various substantially different fluid mass flow can be accurately monitored by inserting different size pistons 12 to precisely produce different gaps 11. The high thermal mass of cylinder 10 and the large surface for exchanges of temperature between the cylinder and the small mass of fluid in the gap 11 ensure the constant temperature of the gas laminarly flowing therein. The device of FIGS. 1 and 1A assures that so long as the Reynolds number in the gap 11 is less than approximately 1200 there is laminar flow and if the temperature is constant mass flow is represented by equation 3.

Figure 3:
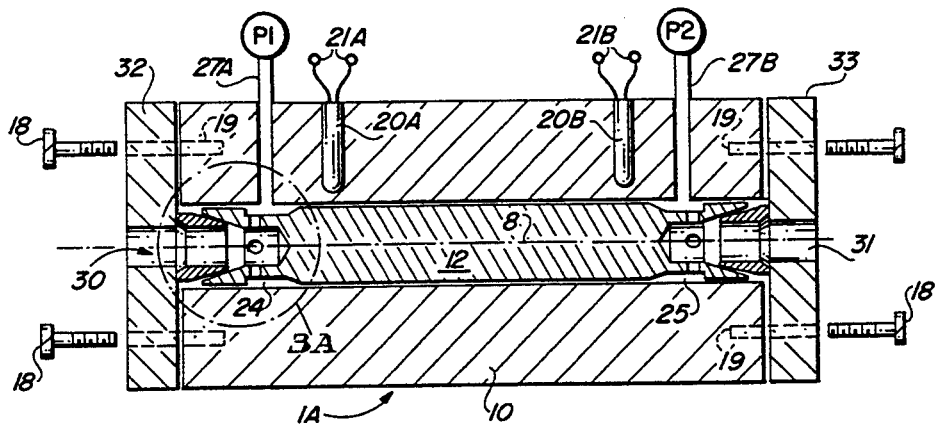
FIG. 3 is a section view of another embodiment of the mass flow meter of the present invention.
Figure 3A:
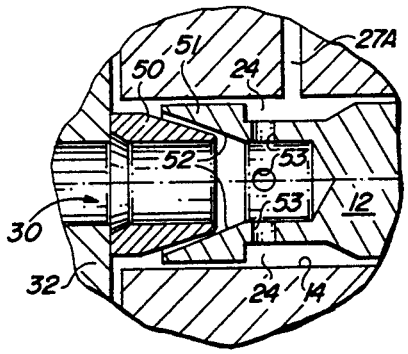
FIG. 3A is an enlarged view of detail 3A in FIG. 3.

FIGS. 3 and 3A show an alternate embodiment of the invention in which the opposite end sections of piston 12 are not conical. Instead, each end section includes a concentric, symmetrical opening 52. The end sections of piston 12 also define two enlarged annular pressure equalization chambers 24 and 25 into which the pressure ports 27A and 27B open to allow pressure measurements to be made upstream and downstream from the gap 11. Four transverse holes 53 (FIG. 3A) in the wall of the flange 51 of the left end section of piston 12 allow laminar flow of fluid into equalization chamber 24 from inlet region 30 and opening 52. Similarly, four transverse holes in the wall of the flange of the right end section of piston 12 allow laminar flow of fluid from equalization chamber 25 into the outlet region 31. In the embodiments of FIGS. 1 and 3, the enlarged equalization chambers 24 and 25 perform the function of equalizing the pressure at the upstream and downstream ends of the longitudinal channel formed by gap 11.

Figure 4A:
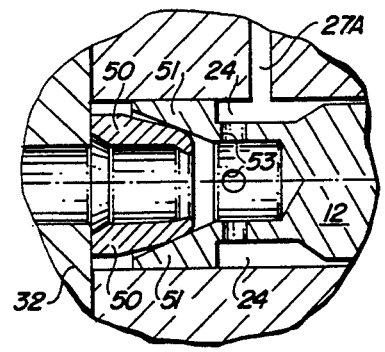
FIG. 4A is an enlarged view of detail 4A of FIG. 4.
Figure 4:
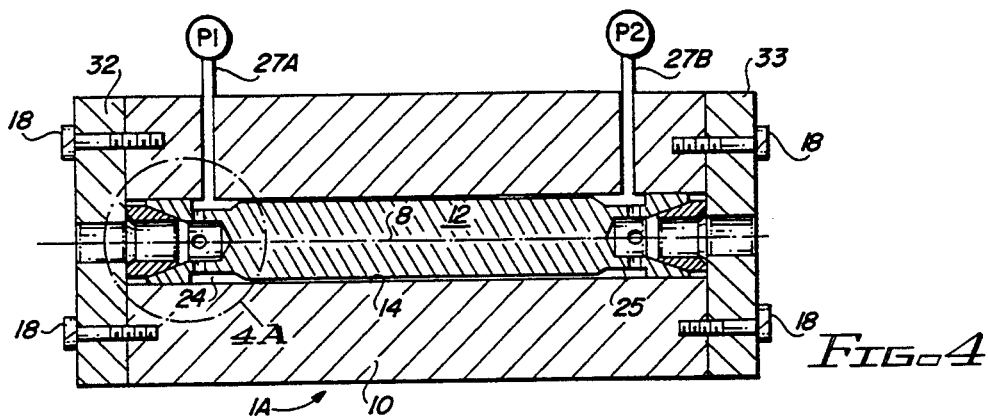
FIG. 4 is a section view of the embodiment of FIG. 2 showing deformation of a flange in the embodiment of FIG. 3 when the end adapters are tightened.

As best shown in FIG. 3A, the left end of piston 12 includes a cylindrical flange 51 having a conical mouth into which a tapered ferrule 50 in contact with the inner surface of end adapter 32 extends. A similar ferrule in contact with on the inner surface of end adapter 33 fits into a conical opening in the opposite end section of piston 12. As in the embodiment of FIGS. 1, 1A, 2, and 2A, before screws 18 are tightened, the ferrules 50 in contact with each of the end adapters fits into an opening 52 at opposite ends of piston 12 so that there is a gap between the inner surfaces of end adapters 32 and 33 and the end faces of cylinder body 10, as shown in FIGS. 3 and 3A. As screws 18 are tightened, the ferrules 50 move into the conical openings 52, forcing the flanges 51 to elastically expand outward as shown in FIGS. 4 and 4A, so the outer surface of flange 51 tightly fit against and seal with the surface of bore 14.

Since the outer surface of flange 51 is perfectly cylindrical and concentric with the outer surface of piston 12 (as it is lapped at the same time) and since bore 14 is perfectly cylindrical, piston 12 is very precisely centered within bore 14 when screws 18 are completely tightened. The embodiment of FIGS. 3 and 4 is especially suitable for gaps 11 in the range from 10 to 50 micrometers.

Figure 5A:
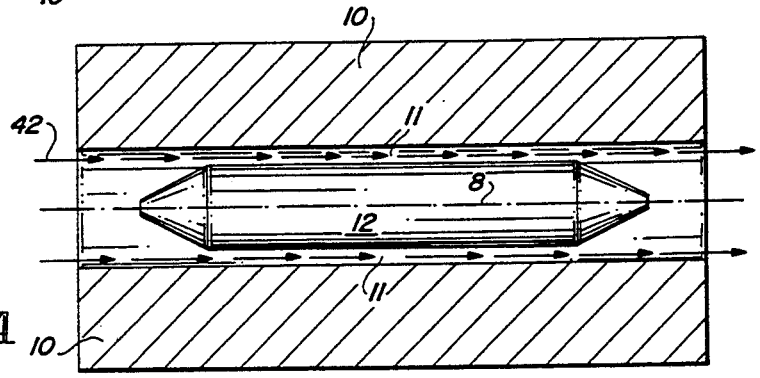
FIGS. 5A and 5B are section views useful in describing the effects of misalignment of the restrictor element in the bore of the mass flow meter.
Figure 5B:
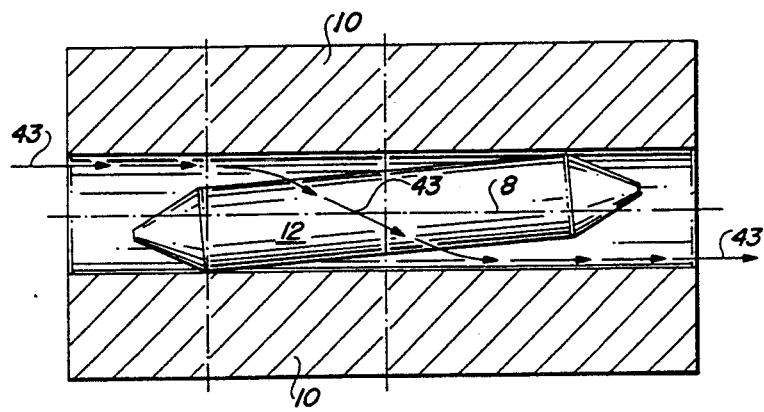

FIGS. 5A and 5B show the importance of maintaining piston 10 precisely centered in and aligned with bore 14. In FIG. 5A arrows 42 indicate the path of laminar flow of gas in gap 11 if piston 12 is concentrically aligned with bore 14 along axis 8. However, if piston 12 is misaligned as shown in FIG. 5B, then the gas (or liquid) flow moves along the direction indicated by arrows 43, producing a longer flow path, a non-uniform gap, and possibly even disrupting laminar flow. If this happens, the assumptions implicit in use of equation (3) are no longer correct, and the accuracy of the computational results is reduced, according to the degree of misalignment.

Now that the structure of the presently preferred embodiments has been set forth, it will be helpful to discuss the equations and computations used in obtaining the mass flow. The general formula for a mass flow meter constructed of a piston 12 in a cylinder 10 as in FIGS. 1 and 3 in which flow of compressible fluid is laminar, is $$qm = \frac{(P_1^2 - P_2^2) \cdot \rho_1 \cdot \pi \cdot R \cdot h^3}{P_1 \cdot \eta \cdot 12 \cdot L}, \quad (1)$$

where $\rho_1$ is the gas density and is given by $$\rho_1 = \rho_N \frac{P_1 \cdot T_N \cdot Z_N}{P_N \cdot T \cdot Z_1}, \quad (2)$$

and where
R = mass flow meter bore radius
h = gap between piston and cylinder
L = length of piston-cylinder assembly
qm = mass flow
$P_1$ = upstream absolute pressure
$P_2$ = downstream absolute pressure
T = absolute temperature
$\rho_N$ = gas normal density
$T_N$ = normal temperature
$P_N$ = normal pressure
$Z_N$ = gas compressibility factor under normal conditions
$Z_1$ = gas compressibility factor under $P_1$, T conditions
$\eta$ = gas dynamic viscosity under $(P_1 + P_2)/2$, T conditions $\rho_N$, $Z_N$, $Z_1$, and $\eta$ are dependent upon the nature of the gas, and $Z_1$ is a polynomial function of P1,T, and $\eta$ is a polynomial function of (P1+P2)/2,T). Those skilled in the art can easily fit polynomial functions to standard gas tables to obtain values of these quantities.

Combining equations (1) and (2) results in:

$$qm = \frac{(P_1^2 - P_2^2) \cdot \rho_N \cdot T_N \cdot Z_N \cdot \pi \cdot R \cdot h^3}{T \cdot Z_1 \cdot \eta \cdot P_N \cdot 12 \cdot L}, \quad (3)$$

for a compressible fluid.

For a non-compressible fluid, qm is instead computed according to $$qm = \frac{(P_1 - P_2) \rho_l \pi R h^3}{\eta_l 6 L}, \quad (3a)$$

with $\rho_l$ being the density of the liquid and $\eta_l$ being the viscosity of the liquid. The influence of changes in the temperature and the average pressure on the liquid density and viscosity can be corrected for by using appropriate polynomial and/or exponential functions.

If $$K_D = \frac{\pi \cdot R \cdot h^3}{6 \cdot L} \quad (4)$$

is defined as a "dimensional constant", then, $$qm = \frac{(P_1^2 - P_2^2) \cdot \rho_N \cdot T_N \cdot Z_N}{2T \cdot Z_1 \cdot \eta \cdot P_N} \times K_D, \tag{5}$$

for a compressible fluid.

For a non-compressible fluid, the following equation is used.

$$qm = \frac{(P_1 - P_2) \rho_l}{\eta_l} \times K_D. \tag{5a}$$

For each diameter of piston 12 used in a mass flow meter body 10, the "dimensional constant" $K_D$ is computed using equation (4).

For each mass flow computation cycle i, the following values are measured:

| | |
|---|---|
| Upstream pressure: | $P1_i$ |
| Differential pressure: | $(P1-P2)_i$ |
| Mean body temperature: | $T_i$ |

For each computational cycle i, gas compressibility $Z_{1i}$ is computed as a function of $P_{1i}$ and $T_i$ for the specific measured gas, and $\eta$ is computed as a function of $(P_1(i)+P_2(i))/2$, and $T_i$ for the specific gas.

With the $T_N$ and $P_N$ standard normal values, and with $\rho_N$ and $Z_N$ values for the measured gas, the mass flow $qm_i$ can be computed using equation (5).

To calibrate a mass flow meter 1, flow of a reference gas from a gas bottle equipped with a regulator and a shut-off valve is directed through mass flow meter 1. The desired nominal upstream pressure for the calibration is adjusted with the regulator. The gas flow is adjusted to the desired nominal value of mass flow meter 1 with a regulating valve located downstream from mass flow meter 1. By summation of the $qm_i$ values of the instantaneous flow during the total time (typically from a few minutes to several hours) of the gas output, the total mass flow $m_t$ of the reference gas that has flowed through the mass flow meter is computed.

The gas flows through mass flow meter 1 during a time t long enough to determine by direct mass measurement the mass variation m of the bottle of gas with an accuracy better than $5 \times 10^{-4}$.

By comparison of the variation m of the bottle mass and the total mass of gas $m_t$, that passed through mass flow meter 1 during the time $\Delta t$, a measured or calibrated value of the dimensional constant $K_D$ is determined. The "calibrated value of the dimensional constant" is called a "geometric constant" which takes into account the possible slight misalignment of the piston in the cylinder.

The total mass of reference gas flowing through the mass flow meter during the time t is equal to:

$$m_t = \sum_{o}^{t} (qm_i)(\Delta t_i) \tag{6}$$

where $\Delta t_i$ is the duration of each measurement cycle i.

The mass variation m is equal to the difference between the mass of the reference bottle of gas before and after the integration time t.

The calibrated value of the dimensional constant which is the "geometric constant" $K_G$ is:

$$K_G = \left(1 - \frac{m_t - m}{m}\right) \times K_D \tag{7}$$

This value of $K_G$ is stored in the EPROM in block 26.

Since the cylinder body 10 and piston 12 are composed of the same material, the radius expansion of the body bore R and the adjustment length expansion of the piston L occur at the same rate with respect to changes in temperature, and therefore compensate each other in the formula (4) of $K_D$, R and L being in the numerator and at the denominator, respectively, of the fraction.

Formula (4) shows that the dimension of $K_D$ is cubic meters, so the relative variation of its value as a function of the temperature is equal to three times the distortion coefficient $\alpha$ of the material used to build the assembly. Then the variation of $K_D$ as a function of the temperature, using 20° C. as the metrological reference of dimensional measurements, is expressed by $$K_D(T) = K_{D20} \cdot \{1 + 3\alpha x [T - (T_N + 20)]\}. \tag{8}$$

For a mass flow meter composed of the above-indicated stainless steel material, $\alpha$ is equal to $16.9 \times 10^{-6}$. Therefore, if this correction is neglected the effect is 0.005% of the reading per ° C. As an example, the effect of the temperature on a "thermal" mass flow controller is about 0.05% of full scale per ° C. on the zero and 0.10% of the reading per ° C. for the span.

When the mean relative working pressure $pm_m = [(P1+P2)/2 - P_N]$ changes, the body bore 14 expands slightly, proportionally to the pressure. Also, the radius and the length of the piston are compressed by a value proportional to the pressure since such deformations are in the elastic range of the material proportional to the pressure $P_m$. The resulting variation in $K_D$ can be expressed by the following equation:

$$K_D(P_m) = K_D \times (1 + \lambda P_m), \tag{9}$$

where $\lambda$ is the relative variation of $K_D$ with the mean relative working pressure $P_m$. $\lambda$ is a function of the gap h, the outside dimensions of the cylinder body 10, the internal bore radius R, the Young's modulus E and the Poisson ratio $\mu$ of material used for the adjustment. The geometric shape of the piston and the cylinder are simple, so the expression of $\lambda$ can be determined using the deformation laws of materials. The expression of $\lambda$ is:

$$\lambda = \frac{1}{E} \times \left[\left(\frac{2R_e^2}{R_e^2 - R^2} - \mu\right) + \frac{6R}{h} \times \left(\frac{R_e^2}{R_e^2 - R^2} - \mu\right)\right], \tag{10}$$

where $R_e$ is an external "equivalent" radius of the body 10 (i.e., the mean value of the sum of the diagonal and the length of an edge of the square shape of body 10), and R is the internal radius of the bore 14.

Since the value of $\lambda$ is affected by the gap h, $\lambda$ is different for each different piston 10 that is used. For the calculation of the mass flow qm, the calculation of the appropriate value of $\lambda$ will be made according to the geometric constant $K_G$ read by computer 28 from the EPROM in block 26 corresponding to the present configuration of mass flow meter 1.

Using formula (4), h can be expressed as a function of the dimensional constant $K_D$, according to:

$$h = \left(\frac{6L \cdot K_D}{\pi R}\right)^{\frac{1}{3}}. \quad (11)$$

Then the expression of $\lambda$ becomes $$\lambda = \frac{1}{E} \times \quad (12)$$

$$\left[\left(\frac{2R_e^2}{R_e^2 - R_2} - \mu\right) + \frac{6R}{(6L \cdot K_D/\pi R)^{\frac{1}{3}}} \times \left(\frac{R_e^2}{R_e^2 - R^2} - \mu\right)\right]$$

In fact, instead of using $K_D$ it is better to use the geometric constant $K_G$ which is the measured value of $K_D$ that takes into account possible concentricity defects of piston 12 in cylinder bore 10.

The mass flow general formula represented by equation (5) can be corrected for various environment effects. Equations (5), (8) and (9) can be combined to obtain $$qm = \frac{(P_1^2 - P_2^2) \cdot \rho_N \cdot T_N \cdot Z_N}{2 \cdot T \cdot Z_1 \cdot \eta \cdot P_N} K_D \times \quad (13)$$

$$\{1 + 3\alpha[T - (T_N + 20)]\}\left\{1 + \lambda \cdot \left[\frac{P_1 + P_2}{2} - P_N\right]\right\}$$

where $\alpha = 16.9 \times 10^{-6}/° C$.
and $$\lambda = \frac{1}{E} \times$$

$$\left[\left(\frac{2R_e^2}{R_e^2 - R_2} - \mu\right) + \frac{6R}{(6L \cdot K_D/\pi R)^{\frac{1}{3}}} \times \left(\frac{R_e^2}{R_e^2 - R^2} - \mu\right)\right]$$

Equation (13) is the final equation that preferably is used for calibration of mass flow meter 1 to take into account possible environment effects during the integration of the instantaneous fluid flow. The value of $K_G$ which will then be used to calculate the mass flow later on is then obtained.

It should be noted that the embodiment of the invention shown in FIG. 3 is more suitable for very small mass flow, for example in the range from 5 to 500 cubic centimeters per minute, than the embodiment of FIG. 1, the latter being more suitable for mass flow in the range from 500 to 20000 cubic centimeters per minute. Both embodiments produce mass flow values with an accuracy of better than 0.1 percent. The embodiment of FIG. 3 is more suitable for very low flow because piston 12 can be machined in such a manner that the outer surfaces of flange 51 and the main cylindrical section of piston 12 can be machined by lapping at the same time before machining of the two chambers 24 and 25 assuring a tolerance of approximately one micrometer of each other. This allows the gap 11 to be as little as 10 micrometers, with sufficiently good accuracy to allow the results using equation (10) to be accurate to within 0.1 percent.

In the embodiment of FIG. 1, the machining tolerances between the concentricity of the tip of the cone-shaped ends 12A and 12B, the cone-shaped openings in the opening 30D in the ferrules 30 and 31, and the concentricity of the outer surface of ferrules 30 and 31 are additive, but for values of h (indicated by arrows 11A in FIG. 1) greater than approximately 50 micrometers, the accumulative tolerance errors are not appreciable.

Utilization of the high flow piston shown in FIG. 1 and the low mass flow piston of FIG. 3 with a variety of values for the gap size h allows very precise mass flow from large values as high as 20,000 cubic centimeters per minute to extremely low values as low as 5 cubic centimeters per minute with accuracies better than 0.1 percent to 0.01 percent.

Figure 6A:
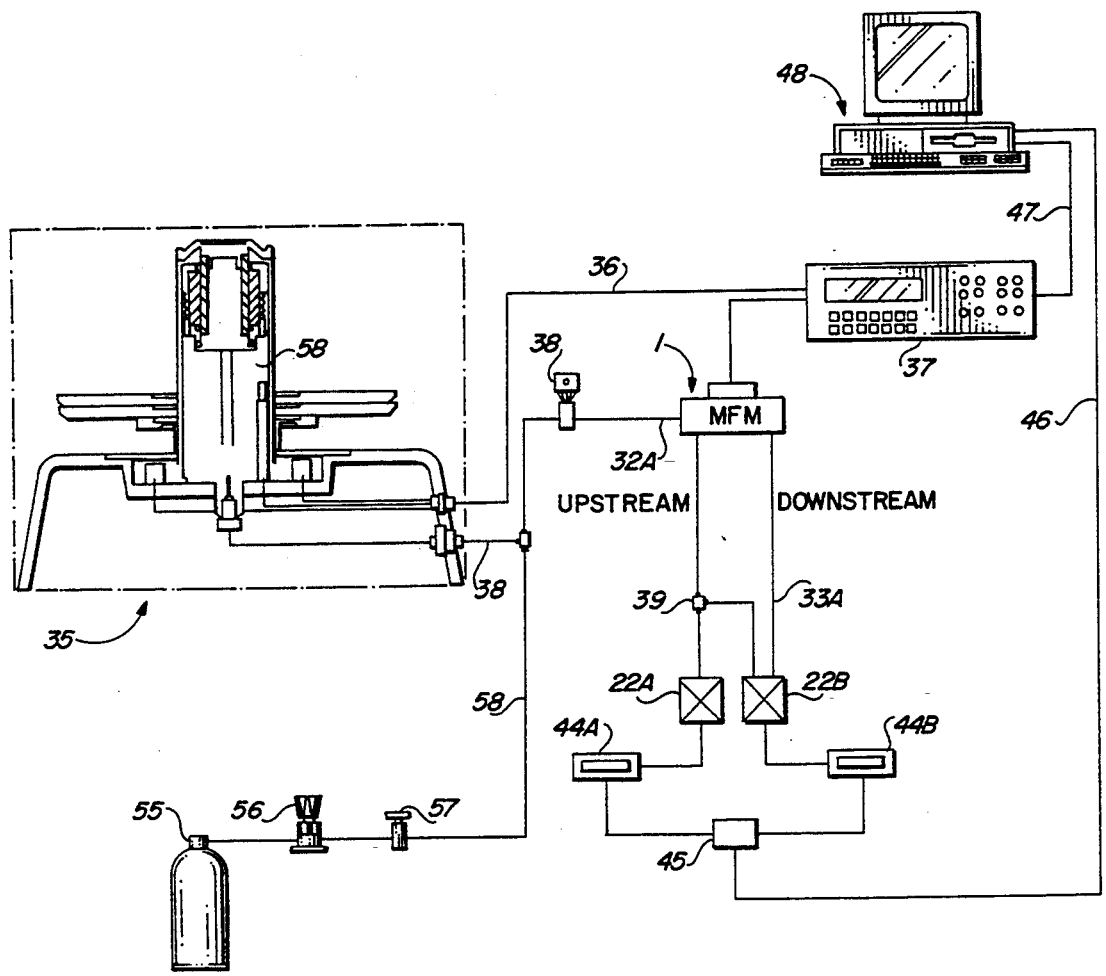
FIG. 6A is a diagram of a setup for calibrating the mass flow meter of the present invention using a dead weight tester.

It should be appreciated that the equation (5) or more refined equation (13) can be used to compute the fluid viscosity $\eta$ for a pressure $p=(P_1+p_2)/2$ and a temperature T if the mass flow is measured by means of a dead weight tester such as 35 in FIG. 6A or by means of a precision scale measuring the weight of a gas bottle before and after supplying the gas flow to the mass flow meter 1, if qm and $\eta$ are interchanged. All other aspects of the measurement and computation are unchanged.

FIG. 6A shows a setup for calibrating mass flow meter 1 for low mass flow, in the range from roughly 5 to 500 sccm (standard cubic centimeters per minute). A bottle 55 of reference gas (usually nitrogen, helium, or argon) fitted with a regulator 56 and a shutoff valve 57 is used to supply reference gas through a tube 58 to a gas operated dead weight tester 35. The gas pressure is adjusted, using regulator 56, to bring the pressure upstream of mass flow meter 1 just to the point at which a piston of dead weight tester 35, loaded with a predetermined mass, is brought to its upper stop. At that pressure, a micrometering valve 38 installed between dead weight tester 35 and mass flow meter 1 is adjusted to set the flow read by mass flow meter 1 to a value near the flow value to be calibrated.

Once stable flow has been established, a shutoff valve 57 between regulator 56 and dead weight tester 35 is closed, interrupting the gas supply to dead weight tester 35 and mass flow meter 1. The gas mass flow then passing through mass flow meter 1 is the gas mass flow caused by the sinking of the piston of dead weight tester 35 at the pressure defined by the mass loaded thereon and the temperature of the mounting post 58 of dead weight tester 35. When the mass flow read by mass flow meter 1 is stable, the fall rate of the piston of dead weight tester 35, the mounting post temperature, atmospheric pressure, and the mass flow being measured by mass flow meter 1 are recorded by means of multimeter 37 and read by computer 48. The mass flow that is computed to have been supplied by the dead weight tester 35 to the flow value measured by mass flow meter 1 allows mass flow meter 1 to be calibrated at the pre-established mass flow. This technique allows mass flow meter 1 to be calibrated at its nominal flow and allows other points in its range to be quickly checked. It should be noted that the value of mass loaded on dead weight tester 35 is adjusted as a function of the mass flow in order to obtain a reasonable and relatively constant piston fall rate within the fall rate range at which accurate measurements can be obtained. Using this technique, the geometric constant is given by the equation $$K_G = \left(1 - \frac{qm(\text{read}) - qm(\text{ref})}{qm(\text{ref})}\right) \times K_D, \quad (14)$$

where $K_D$ is the dimensional constant (given by equation (4)) used to compute qm(read) during the test, qm(read) is the mass flow read by mass flow meter 1, and qm(ref) is given by the equation $$qm(\text{ref}) = S_{\text{eff}} \cdot [v - v'] \cdot \rho_N \frac{(P_g + P_{atm}) \cdot T_N \cdot Z_N}{P_N \cdot T_g \cdot Z_g}, \quad (15)$$

where $$v' = v_0 v_1 p_g + v_2 p_g^2, \quad (15a)$$

and where $Z_g$ is calculated by the polynomial function of $(p_g + P_{atm}), T_g$, depending on the nature of the reference gas used. v' is the correction for the inherent fall rate of the piston of the dead weight tester due to the gas flowing through the annular space of its piston. This value of v' is determined experimentally by shutting off the dead weight tester. It can be expressed by the polynomial function (15a) of the pressure $p_g$ for each reference gas used. The terms in equation (15) are given by

| | | |
|---|---|---|
| v | the fall rate of the piston | [m/s] |
| $S_{eff}$ | the surface area of the piston-cylinder | [m²] |
| $p_g$ | the gauge pressure defined by the dwt | [Pa] |
| $P_{atm}$ | atmospheric pressure | [Pa] |
| $T_g$ | the absolute temperature of the dwt | [°K.] |
| $\rho_N$ | standard density of the gas | [Kg/m³] |
| $T_N$ | standard temperature | [273.15° K.] |
| $P_N$ | standard pressure | [101325 Pa] |
| $Z_N$ | compressibility factor of the gas under standard conditions | [−] |
| $Z_g$ | compressibility factor of the gas under the conditions (Pg + atm.), $T_g$ | [−] |

This value of $K_G$ is stored in EPROM 26 of mass flow meter 1.

Figure 6B:
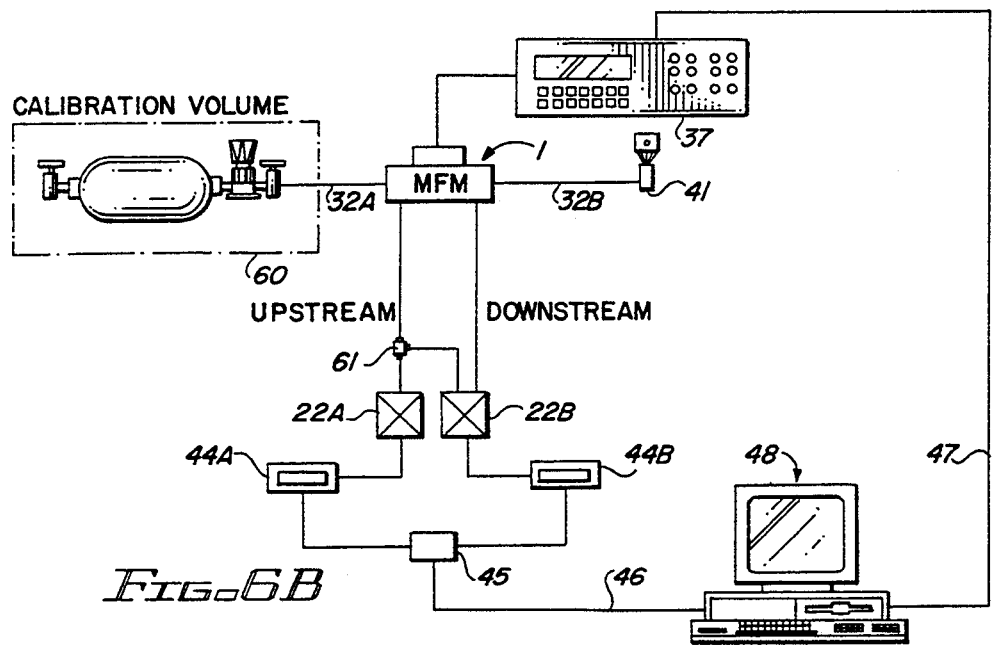
FIG. 6B is a diagram of a setup for calibrating the mass flow meter of the present invention using a precision mass weighing system.

Next, FIG. 6B shows a setup that can be used for any range, but is preferable for calibrating mass flow meter 1 for higher mass flow in the range from roughly 50 to 20,000 sccm, because for very low range mass flow meters the amount of time of mathematical integration required to obtain accurate mass measurements of the bottle of gas becomes extremely long. In this technique, a reference gas from a gas bottle in a precision mass weighing system 60 is equipped with a regulator and a shutoff valve. The regulator is adjusted to provide the upstream pressure at which the calibration is to be performed. The mass flow is adjusted to the nominal value of mass flow meter 1 with a micrometering valve 41 located downstream therefrom. By summation of the mass flow values qm(i) of the instantaneous flow during the total flow time, the total mass flow m(t) of the reference gas passing through mass flow meter 1 is obtained. The gas flow through mass flow meter 1 is allowed to flow for a period of time t which is sufficiently long to determine by direct mass measurement of mass variation m of the bottle of gas in block 60, with an accuracy of better than 5 times $10^{-4}$. By comparison of the variation of the bottle mass m and the total mass of gas m(t) that pass through mass flow meter 1, a measured value of the "dimensional constant" is determined, and is called the "geometric constant" and takes account of possible misalignment of piston 12 in bore 14. The geometric constant is determined by the equation $$K_G = \left(1 - \frac{m(t) - m}{m}\right) \times K_D \quad (16)$$

where $K_D$ is the value of the dimensional constant (according to equation (4)) used to perform the integrations of m(t) during the test. The value given by equation (16) then is stored in EPROM 26 of mass flow meter 1.

Figure 7A:
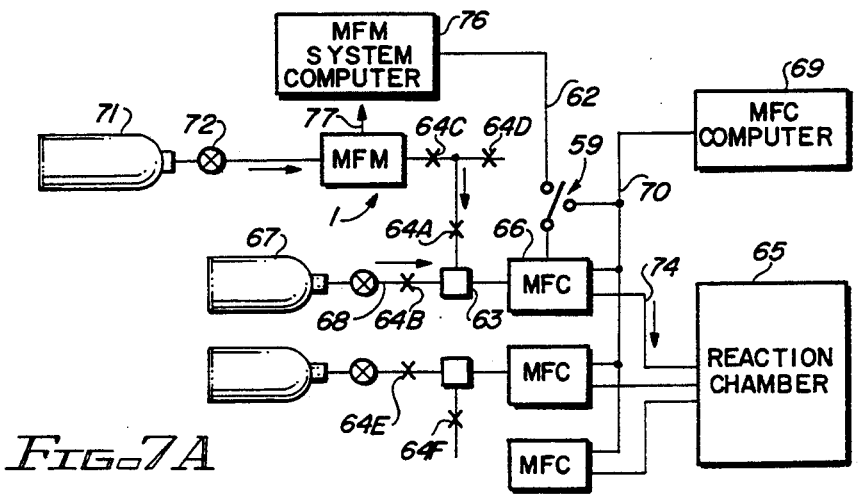
FIG. 7A is a diagram of a technique for in situ calibration of a mass flow controller using the mass flow meter of the present invention.

FIG. 7A shows the setup for in situ calibration of a mass flow controller such as 66 that controls flow reactant gas into a semiconductor processing reaction chamber 65. Reactant gas source 67 supplies a flow of gas through tube 68 into the inlet of mass flow controller 66. Typically, other mass flow controllers which need to be periodically calibrated also supply other reactant gases to reaction chamber 65. A processing system control computer 69 produces analog control signals on conductors 70 to control mass flow controller 66.

To effectuate calibration of mass flow controller 66 without disconnecting it from the semiconductor processing system, a T connector 63 is provided in series with tube 68 so that gas flowing through mass flow meter 1 of the present invention is caused to also flow through mass flow controller 66. Shutoff valves 64A and 64B are set so as to allow the reactant gas 67 to flow through mass flow controller 66, or to allow a reference gas from bottle 71 to flow through both mass flow meter 1 and mass flow controller 66. Adequate connection procedures are used to ensure that no air remains in the connection between valves 64A, 64C, and 64D prior to opening valve 64A.

Mass flow meter 1 is connected to a mass flow meter system computer 76 by digital conductors 77. The mass flow controller computer 69 defines the set point value of the flow through the mass flow controller 66 by means of an analog signal on conductor 70. The mass flow meter system computer 76 reads and displays the mass flow of the reference gas which is provided by bottle 71 to mass flow meter 1 and through mass flow controller 66 to reaction chamber 65 with valve 64A open and valve 64B closed. If the two values do not agree within a preselected tolerance, mass flow meter system controller 76 takes control of mass flow controller 66 by means of switch 59 and conductor 62 and disconnecting mass flow controller 66 from conductor 70. Then the complete in situ calibration or re-calibration can be performed over the desired range to determine the appropriate corrections for the analog signal provided by mass flow controller computer 69 on conductor 70 representing the desired mass flow value.

Figure 7B:
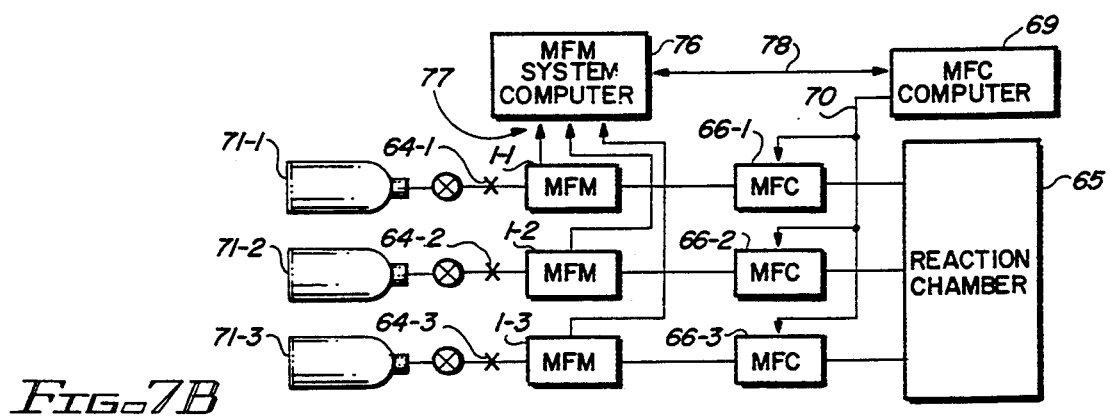
FIG. 7B is a diagram of a permanent system for in situ recalibration of a mass flow controller using the mass flow meter of the present invention.

FIG. 7B shows a permanent setup for continuous in situ monitoring of the drift of mass flow controllers 66-1, 66-2, and 66-3 and re-calibration thereof. Computer 76 communicates by digital conductors 78 with system computer 69 so that mass flow controller computer 69 can compare the precisely measured reference gas mass flow through mass flow meter 1 that was found at the startup of the system after calibration of mass flow controller 66-1 when it was first set to control the desired mass flow value for the gas supplied by bottle 71-1. Any disagreement beyond an established tolerance is used by mass flow controller computer 69 to computer a calibration constant that is used to provide an adjusted analog signal on conductor 71 to mass flow controller 66-1 to compensate for its drift. The same procedure is repeated for mass flow controllers 66-2 and 66-3 using mass flow meters 1-2 and 1-3 to precisely measure other reaction gases supplied by bottles 71-2 and 71-3, respectively.

The mass flow meter of the present invention provides a mass flow calibration reference of sufficient accuracy to use in in situ testing of mass flow controllers in a variety of industrial applications, such as controlling minute flows of reactant gases in semiconductor process reaction chambers. The mass flow meter of the invention is completely bi-directional, and can be used for mass flow of liquids or fluids, if the Reynolds numbers are smaller than 1200 which assures laminar flow conditions. Its accuracy depends only on the geometric dimensions of the mechanical assembly, the physical characteristics of the measured gas, pressure measurements upstream and downstream of a laminar element, and the average temperature of the mechanical assembly. The very high accuracy of the mass flow meter of FIG. 3 at very low mass flow allows it to be useful as a null flow indicator, especially for applications in which it is necessary to ensure that a minute gas flow is in a particular direction. The described mass flow meter also has application in calibration of gas leak rates and in precise mixing of gases for the purpose of calibrating gas chromatography systems.

The upstream temperature of the gas has no appreciable effect on the accuracy of the mass flow measurements because going through holes 30B or 53 of the laminar flow restriction and in chamber 24 that gas takes on nearly the temperature of the body before flowing into the gap 11 and because the thermal mass of the body 10 and piston 12 is considerably higher than that of the mass of the gas or fluid being measured in gap 11, and the thin film of gas has a large surface of thermal exchange with the body. The described mass flow meter uses only straight line geometric shapes of large enough diameters so that the parts can be electropolished to obtain excellent surface finishes to assure the cleanliness of the system and that uses a small number of parts so that it can be disassembled and reassembled for cleaning without significantly affecting the geometric constant of the system. The use of simple geometric shapes allows the mass flow meter to be easily and accurately mathematically modeled, allowing convenient design for various desired mass flow.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention. For example, it should be appreciated that if the channel depth is extremely small, e.g., less than 10 microns, mass flow meter 1 can be used to accurately measure the resulting very low mass flow through the annular channel. Here, the mass flow can be referred to as being in the "molecular regime", in which the fluid flow is partially laminar and partially in the molecular regime. Suitable correction factors can be applied to the above equations to account for the partial non-laminar flow in this condition. For large values of the Reynold's number Re, correction factors such as $(1+B \cdot R_e + \gamma R_e^2)$ can be used, where B and $\gamma$ are empirically determined parameters.

What is claimed is:
1. A mass flow meter comprising in combination:
   (a) a body having a cylindrical bore therein;
   (b) an elongated cylindrical piston positioned in the bore concentrically therewith, an elongated annular fluid flow channel of uniform depth being bounded by a cylindrical surface of the piston and a surface of the bore, fluid flowing laminarly through the channel;
   (c) first and second elastically deformable positioning and holding means located at first and second end portions of the piston, respectively, for precisely positioning and holding the piston concentrically in the bore by elastically expanding in response to longitudinal forces on the first and second end portions of the piston to symmetrically engage a wall of the bore, the bore and the first end portion of the piston bounding a first pressure equalization chamber behind a first laminar flow restriction upstream from the channel, the bore and the second end portion of the piston bounding a second pressure equalization chamber before a second laminar flow restriction downstream from the channel;
   (d) first pressure measuring means in fluid communication with the first pressure equalization chamber for measuring fluid pressure in the first pressure equalization chamber, and second pressure measuring means in fluid communication with the first and second pressure equalization chambers for measuring the difference in fluid pressure between the first and second pressure equalization chambers;
   (e) means for maintaining the temperature of the fluid flowing through the channel constant;
   (f) means for determining the temperature of the fluid flowing through the channel; and
   (g) means for computing a mass flow of the fluid through the channel on the basis of a difference between the pressure measured in the first pressure equalization chamber and the pressure measured in the second pressure equalization chamber, and the temperature of the fluid flowing through the channel.

2. The mass flow meter of claim 1 including first and second temperature probes disposed in spaced relationship to each other in the body adjacent to opposite end portions of the channel.

3. The mass flow meter of claim 2 wherein the first and second pressure measuring means produce corresponding first and second pressure signals and wherein the first and second temperature probes are connected in series to produce a signal that is the mean value of the first and second temperatures, the computing means computing the mass flow of fluid in the channel in accordance with the first and second pressure signals and the mean value temperature signal.

4. The mass flow meter of claim 3 wherein the computing means computes the mass flow in accordance with the equation $$q_m = \frac{(P_1^2 - P_2^2) \cdot \rho_N \cdot T_N \cdot Z_N \cdot \pi \cdot R \cdot h^3}{T \cdot Z_1 \cdot \eta \cdot P_N \cdot 12 \cdot L},$$

wherein R is the mass flow meter bore radius, h is the gap between piston and cylinder, L is the length of piston-cylinder assembly, $P_1$ is the upstream absolute pressure, $P_2$ is the downstream absolute pressure, T is the absolute temperature, $\rho_N$ is the gas normal density, $T_N$ is the normal temperature, $P_N$ is the normal pressure, $Z_N$ is the gas compressibility factor under normal conditions, $Z_1$ is the gas compressibility factor under $P_1$,T conditions, and $\eta$ is the gas dynamic viscosity under $(P_1+P_2)/2$, T conditions.

5. The mass flow meter of claim 1 wherein the first and second end portions of the piston are conically tapered and wherein the first and second positioning and holding means include first and second ferrules, respectively, the first and second ferrules each being generally hollow and having an outer cylindrical portion having an outer surface and each having an inner end wall with a concentric hole therein receiving one of the first and second end portions of the piston, respectively, the longitudinal forces elastically deforming the inner end wall and causing elastic expanding of the outer surfaces of the first and second ferrules, causing them to symmetrically engage the wall of the bore and precisely position and hold the piston concentrically in the bore.

6. The mass flow meter of claim 5 wherein the inner end wall of the first ferrule includes a plurality of flow holes symmetrically positioned around a center hole of the first ferrule those holes being of such diameter as to improve laminarity of the flow of the fluid through the holes.

7. The mass flow meter of claim 6 wherein the longitudinal forces are produced by forcing an end plate against the outer cylindrical portion of one of the ferrules.

8. The mass flow meter of claim 1 wherein the first and second positioning and holding means include first and second cylindrical flanges attached to the first and second end portions of the piston, respectively, the first and second cylindrical flanges each having a tapered inner surface, the first and second positioning and holding means also including first and second tapered elements engaging first and second end walls bounding opposite ends of the bore and extending into openings defined by the tapered inner surfaces, respectively, the longitudinal forces forcing the first and second tapered elements against the tapered inner surfaces, respectively, causing expansion of the first and second flanges and causing outer surfaces of the first and second flanges to symmetrically engage the wall of the bore and precisely position and hold the piston concentrically in the bore.

9. The mass flow meter of claim 8 including a plurality of transverse holes of such diameter as to cause laminar flow through those transverse holes extending from the tapered surface opening in the first end portion of the piston to the first pressure equalization chamber.

10. A method for measuring fluid mass flow, comprising the steps of:
(a) supporting an elongated cylindrical piston concentrically in an elongated annular fluid flow channel of uniform depth bounded by a cylindrical surface of the piston and a surface of a bore of a body of a mass flow meter;
(b) forcing fluid to flow laminarly through a first laminar flow restriction upstream from a first pressure equalization chamber bounded by the bore and a first end portion of the piston, through the channel, and then through a second pressure equalization chamber downstream from the channel, the second pressure equalization chamber being bounded by the bore, a second end portion of the piston, and a second laminar flow restriction;
(c) maintaining the temperature of the gas being forced through the channel at a substantially constant uniform value equal to the temperature of the body by transfer of heat from the body to the gas being forced through the channel;
(d) measuring the temperature of the body to determine the temperature of the gas in the channel;
(e) determining an upstream pressure of gas in the first pressure equalization chamber, and also determining a pressure difference between the upstream pressure and a downstream pressure of gas in the second pressure equalization chamber; and
(f) computing a value representing a mass flow of the gas through the channel from the upstream pressure, the pressure difference, and the temperature of the body.

11. The method of claim 10 including measuring an average value of a first temperature and a second temperature using first and second temperature probes disposed in spaced relationship to each other in the body adjacent to opposite end portions of the channel, and averaging signals produced by the first and second probes by connecting them in series to obtain an average temperature to obtain the value representing the mass flow.

12. The method of claim 10 including changing a fluid flow range of the mass flow meter by removing the piston and replacing it with an elongated cylindrical piston having a different diameter to provide a different depth of the annular fluid flow channel.

13. A method for measuring gas mass flow, comprising the steps of:
(a) supporting an elongated cylindrical piston concentrically in an elongated annular fluid flow channel of uniform depth bounded by a cylindrical surface of the piston and a surface of a bore of a body of a mass flow meter;
(b) forcing gas to flow laminarly through a first laminar flow restriction upstream from a first pressure equalization chamber bounded by the bore and a first end portion of the piston, through the channel, and then through a second pressure equalization chamber downstream from the channel, the second pressure equalization chamber being bounded by the bore, a second end portion of the piston, and a second laminar flow restriction;
(c) maintaining the temperature of the gas being forced through the channel at a substantially constant uniform value equal to the temperature of the body;
(d) measuring the temperature of the body to determine the temperature of the gas in the channel;
(e) determining an upstream pressure of gas in the first pressure equalization chamber, and also determining a pressure difference between the upstream pressure and a downstream pressure of gas in the second pressure equalization chamber; and
(f) computing a value representing a mass flow of the gas through the channel from the upstream pressure, the pressure difference, and the temperature of the body,
wherein step (f) includes obtaining the value representing the mass flow in accordance with the equation $$qm = \frac{(P_1^2 - P_2^2) \cdot \rho_N \cdot T_N \cdot Z_N \cdot \pi \cdot R \cdot h^3}{T \cdot Z_1 \cdot \eta \cdot P_N \cdot 12 \cdot L},$$

wherein R is the mass flow meter bore radius, h is the gap between piston and cylinder, L is the length of piston-cylinder assembly, $P_1$ is the upstream absolute pressure, $P_2$ is the downstream absolute pressure, T is the absolute temperature of the body, $\rho_N$ is the gas normal density, $T_N$ is the normal temperature, $P_N$ is the normal pressure, $Z_N$ is the gas compressibility factor under normal conditions, $Z_1$ is the gas compressibility factor under $P_1$,T conditions, and $\eta$ is the gas dynamic viscosity under $(P_1+P_2)/2$, T conditions.

14. A method for measuring gas mass flow, comprising the steps of:
   (a) supporting an elongated cylindrical piston concentrically in an elongated annular fluid flow channel of uniform depth bounded by a cylindrical surface of the piston and a surface of a bore of a body of a mass flow meter;
   (b) forcing gas to flow laminarly through a first laminar flow restriction upstream from a first pressure equalization chamber bounded by the bore and a first end portion of the piston, through the channel, and then through a second pressure equalization chamber downstream from the channel, the second pressure equalization chamber being bounded by the bore, second end portion of the piston, and a second laminar flow restriction;
   (c) maintaining the temperature of the gas being forced through the channel at a substantially constant uniform value equal to the temperature of the body;
   (d) measuring the temperature of the body to determine the temperature of the gas in the channel;
   (e) determining an upstream pressure of gas in the first pressure equalization chamber, and also determining a pressure difference between the upstream pressure and a downstream pressure of gas in the second pressure equalization chamber; and
   (f) computing a value representing a mass flow of the gas through the channel from the upstream pressure, the pressure difference, and the temperature of the body,
wherein step (f) includes obtaining the value representing the mass flow in accordance with the equation $$qm = \frac{(P_1^2 - P_2^2) \cdot \rho_N \cdot T_N \cdot Z_N}{2 \cdot T \cdot Z_1 \cdot \eta \cdot P_N} K_D \times$$

$$\{1 + 3\alpha[T - (T_N + 20)]\} \left( 1 + \lambda \cdot \left[ \frac{P_1 + P_2}{2} - P_N \right] \right)$$

wherein $P_1$ is the upstream absolute pressure, $P_2$ is the downstream absolute pressure, T is the absolute temperature of the body, $\rho_N$ is the gas normal density, $T_N$ is the normal temperature, $P_N$ is the normal pressure, $Z_N$ is the gas compressibility factor under normal conditions, $Z_1$ is the gas compressibility factor under $P_1$,T conditions, $\eta$ is the gas dynamic viscosity under $(P_1+P_2)/2$, T conditions, $K_G$ is a geometric constant, $\alpha$ is the linear coefficient of expansion with respect to temperature of the material of the body and the piston, and $\gamma$ is the relative variation of $K_G$ with the average pressure in the channel.

15. A method for measuring gas mass flow, comprising the steps of:
   (a) supporting an elongated cylindrical piston concentrically in an elongated annular fluid flow channel of uniform depth bounded by a cylindrical surface of the piston and a surface of a bore of a body of a mass flow meter;
   (b) forcing gas to flow laminarly through the channel, the body having a thermal mass that sufficiently exceeds a thermal mass of the gas in the channel that a temperature of the gas in the channel is constant and uniform;
   (c) determining a temperature of the gas in the channel by measuring the temperature of the body;
   (d) determining an upstream pressure of the gas immediately upstream from the channel and also determining a pressure difference between a upstream pressure of the gas immediately upstream from the channel and a downstream pressure of the gas immediately downstream from the channel; and
   (e) computing a value representing a mass flow of the gas through the channel from the upstream pressure, the pressure difference and the measured temperature of the body.

16. A mass flow meter comprising in combination:
   (a) a body having a cylindrical bore therein;
   (b) an elongated cylindrical piston positioned in the bore concentrically therewith, an elongated annular fluid flow channel of uniform depth being bounded by a cylindrical surface of the piston and a surface of the bore, gas flowing laminarly through the channel;
   (c) first and second positioning and holding ferrules located at first and second end portions of the piston, respectively, precisely positioning and holding the piston concentrically in the bore by symmetrically engaging a wall of the bore, the bore and the first end portion of the piston bounding a first pressure equalization chamber behind a first laminar flow restriction upstream from the channel, the bore and the second end portion of the piston bounding a second pressure equalization chamber before a second laminar flow restriction downstream from the channel, the body having a thermal mass that sufficiently exceeds a thermal mass of the gas in the channel that a temperature of the gas in the channel rapidly assumes the temperature of the body;
   (d) a first pressure measuring device in fluid communication with the first pressure equalization chamber to measure gas pressure in the first pressure equalization chamber, and a second pressure measuring device connected in fluid communication with the first and second pressure equalization chambers to measure the difference in gas pressure between the first and second pressure equalization chambers;
   (e) a temperature probe disposed in the body to measure the temperature of the body to determine the temperature of the gas flowing through the channel; and
   (f) a computing device computing a mass flow of the gas through the channel on the basis of the pressure measured in the first pressure equalization chamber, the difference between the pressure measured in the first pressure equalization chamber and the pressure measured in the second pressure equalization chamber, and the temperature of the gas flowing through the channel.

17. An apparatus for measuring gas mass flow, comprising in combination;
   (a) an elongated cylindrical piston supported concentrically in an elongated annular gas flow channel of uniform depth bounded by a cylindrical surface of the piston and a surface of a bore of a body of a mass flow meter, gas flowing laminarly through the channel, the body having a thermal mass that sufficiently exceeds a thermal mass of the gas in the channel that a temperature of the gas in the channel assumes the temperature of the body;
   (c) a temperature probe connected to measure the temperature of the body to determine the temperature of the gas flowing through the channel;
   (d) a first pressure measuring device connected in fluid communication with the gas immediately upstream from the channel to determine an upstream pressure, and a second pressure measuring device connected in fluid communication with the gas immediately downstream from the channel to determine a pressure difference between the upstream pressure and a downstream pressure; and
   (e) a computer operated to compute a value representing a mass flow of the gas through the channel from the upstream pressure, the pressure difference, and the temperature of the gas flowing through the channel.

18. A method for measuring gas mass flow, comprising the steps of:
   (a) supporting an elongated cylindrical piston concentrically in an elongated annular fluid flow channel of uniform depth bounded by a cylindrical surface of the piston and a surface of a bore of a body of a mass flow meter;
   (b) forcing gas to flow laminarly through the channel, the body having a thermal mass that sufficiently exceeds a thermal mass of the gas in the channel such that a temperature of the gas in the channel is constant and uniform and equal to the temperature of the body;
   (c) determining a temperature of the gas in the channel by measuring the temperature of the body;
   (d) determining an upstream pressure of the gas immediately upstream from the channel and also determining a pressure difference between the upstream pressure and a downstream pressure of the gas immediately downstream from the channel; and
   (e) computing a value representing a mass flow of the gas through the channel from the upstream pressure, the pressure difference, and the temperature of the gas in the channel.

19. An apparatus for measuring gas mass flow, comprising in combination:
   (a) an elongated cylindrical piston supported concentrically in an elongated annular fluid flow channel of uniform depth bounded by a cylindrical surface of the piston and a surface of a bore of a body of a mass flow meter, gas flowing laminarly through the channel, the body having a thermal mass that sufficiently exceeds a thermal mass of the gas in the channel such that the temperature of the gas in the channel is equal to the temperature of the body;
   (c) a temperature probe disposed in the body to measure the temperature of the body to determine the temperature of the gas in the channel;
   (d) a first pressure measuring device connected in fluid communication with the gas immediately upstream from the channel to determine an upstream pressure, and a second pressure measuring device connected in fluid communication with the gas immediately downstream from the channel to determine a pressure difference between the upstream pressure and a downstream pressure; and
   (e) a computer operated to compute a value representing a mass flow of the gas through the channel from the upstream pressure, the pressure difference, and the temperature of the gas in the channel.

20. A method for measuring gas mass flow, comprising the steps of:
   (a) forming a elongated fluid flow channel extending through a body;
   (b) forcing gas to flow laminarly through the channel, the body having a thermal mass that sufficiently exceeds a thermal mass of the gas in the channel such that a temperature of the gas in the channel is constant and uniform and equal to the temperature of the body;
   (c) determining a temperature of the gas in the channel by measuring the temperature of the body;
   (d) determining an upstream pressure of the gas immediately upstream from the channel and also determining a pressure difference between the upstream pressure and a downstream pressure of the gas immediately downstream from the channel; and
   (e) computing a value representing a mass flow of the gas through the channel from the upstream pressure, the pressure difference, and the temperature of the body.

21. An apparatus for measuring gas mass flow, comprising in combination:
   (a) a body and an elongated fluid flow channel extending through the body, gas flowing laminarly through the channel, the body having a thermal mass that sufficiently exceeds a thermal mass of the gas in the channel that a temperature of the gas in the channel is equal to the temperature of the body;
   (c) a temperature probe disposed in the body to measure the temperature of the body and hence the temperature of the gas in the channel;
   (d) a first pressure measuring device connected in fluid communication with the gas immediately upstream from the channel to determine an upstream pressure, and a second pressure measuring device connected in fluid communication with the gas immediately downstream from the channel to determine a pressure difference between the upstream pressure and a downstream pressure; and
   (e) a computer operated to compute a value representing a mass flow of the gas through the channel from the upstream pressure, the pressure difference, and the temperature of the body.

* * * * *